United States Patent
Chong et al.

(10) Patent No.: US 10,295,263 B2
(45) Date of Patent: May 21, 2019

(54) SYSTEM AND METHOD USING BUFFER TANK FOR HEAT EXCHANGE

(71) Applicant: SCHLUMBERGER TECHNOLOGY CORPORATION, Sugar Land, TX (US)

(72) Inventors: Jonathan Wun Shiung Chong, Sugar Land, TX (US); Rod William Shampine, Houston, TX (US); Garud Bindiganavale Sridhar, Sugar Land, TX (US); Christopher Joseph Decker, Richmond, TX (US); Gregoire Omont, Sugar Land, TX (US); Rajesh Luharuka, Katy, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 638 days.

(21) Appl. No.: 14/561,500

(22) Filed: Dec. 5, 2014

(65) Prior Publication Data

US 2016/0161188 A1 Jun. 9, 2016

(51) Int. Cl.
*F28D 1/04* (2006.01)
*F28D 1/02* (2006.01)
(Continued)

(52) U.S. Cl.
CPC ............ *F28D 1/0213* (2013.01); *E21B 43/26* (2013.01); *F28D 1/0226* (2013.01);
(Continued)

(58) Field of Classification Search
CPC . F28D 1/02; F28D 1/06; F28D 1/0213; F28D 1/00; F28D 1/04; E21B 36/001; E21B 36/006; E21B 36/00; E21B 43/26
(Continued)

(56) References Cited

U.S. PATENT DOCUMENTS 2,545,371 A * 3/1951 Mojonnier ................ F28D 1/06
165/109.1
4,593,763 A 6/1986 Burke
(Continued)

OTHER PUBLICATIONS

International Search Report issued in PCT/US2015/061508; dated Jan. 28, 2016; 3 pages.
(Continued)

*Primary Examiner* — Brad Harcourt
*Assistant Examiner* — David Carroll (57) ABSTRACT

A technique facilitates removal of heat. The technique involves moving a process fluid through a buffer tank which is combined with a heat exchange system. The heat exchange system includes a conduit carrying a coolant fluid which removes excess heat from a heat source. The conduit is routed to the buffer tank so that the cooler process fluid moving through the buffer tank is able to remove heat from the coolant fluid before it is routed back to the heat source for continued heat removal. In a well application, for example, a heat source, e.g. an electric motor, may be located on a transport vehicle and cooled by the coolant fluid. The heat transferred to the coolant fluid from the heat source is removed by routing the coolant fluid through the conduit associated with the buffer tank. This enables the cooler process fluid in the buffer tank to be used in lowering the temperature of the coolant fluid.

20 Claims, 6 Drawing Sheets

(51) Int. Cl.
*E21B 43/26* (2006.01)
*F28D 20/00* (2006.01)
(52) U.S. Cl.
CPC ........... F28D 1/0408 (2013.01); F28D 20/00 (2013.01); *F28D 2020/0026* (2013.01); *Y02E 60/142* (2013.01)
(58) Field of Classification Search
USPC ............................................ 166/302; 175/17
See application file for complete search history.

(56) References Cited

U.S. PATENT DOCUMENTS

| | | | | |
|---|---|---|---|---|
| 6,161,358 A * | 12/2000 | Mochizuki | ............... | E21B 15/00 405/201 |
| 6,431,271 B1 * | 8/2002 | Thomeer | ............... | E21B 17/206 166/195 |
| 2005/0039906 A1 * | 2/2005 | Foster | ..................... | E21B 36/00 166/57 |
| 2005/0082064 A1 * | 4/2005 | Foster | ..................... | E21B 19/22 166/303 |
| 2005/0241857 A1 * | 11/2005 | Beato | ....................... | E21B 15/00 175/57 |
| 2006/0196678 A1 * | 9/2006 | Connell | .................. | E21B 29/10 166/380 |
| 2006/0201677 A1 * | 9/2006 | Moody | ............... | E21B 41/0042 166/313 |
| 2009/0308602 A1 * | 12/2009 | Bruins | .................. | E21B 21/062 166/250.01 |
| 2011/0005757 A1 | 1/2011 | Hebert | | |
| 2011/0079561 A1 * | 4/2011 | Masters | .................. | F24D 17/00 210/774 |
| 2012/0149606 A1 * | 6/2012 | Abad | ....................... | C09K 8/03 507/213 |
| 2013/0319022 A1 | 12/2013 | Becze et al. | | |
| 2014/0144641 A1 * | 5/2014 | Chandler | .................. | F24H 1/08 166/303 |
| 2014/0174691 A1 * | 6/2014 | Kamps | ............... | B60H 1/00264 165/41 |
| 2014/0209281 A1 * | 7/2014 | Kamps | ..................... | F28D 7/00 165/104.14 |
| 2014/0311707 A1 * | 10/2014 | Wiebe | ..................... | E21B 36/00 165/64 |

OTHER PUBLICATIONS

Written Opinion issued in PCT/US2015/061508; dated Jan. 28, 2016; 9 pages.

* cited by examiner

SYSTEM AND METHOD USING BUFFER TANK FOR HEAT EXCHANGE

BACKGROUND

In a variety of well applications, heat loads are created by various equipment and cooling techniques are used to remove excess heat. In some applications, liquid-to-liquid heat exchangers have been employed, but such techniques subject the equipment to a risk of fouling when the fluids entering the heat exchangers are of poor quality. For example, produced water with high salinity, silt, and/or chemical content can foul or otherwise detrimentally affect the heat exchange equipment.

SUMMARY

In general, a system and methodology are provided for removing heat. The technique involves moving a process fluid through a buffer tank which is combined with a heat exchange system. The heat exchange system includes a conduit carrying a coolant fluid which removes excess heat from a heat source. The conduit is routed to the buffer tank so that the cooler process fluid moving through the buffer tank is able to remove heat from the coolant fluid before it is routed back to the heat source for continued heat removal. In a well application, for example, a heat source, e.g. an electric motor, may be located on a transport vehicle and cooled by the coolant fluid. The heat transferred to the coolant fluid from the heat source is removed by routing the coolant fluid through a conduit associated with the buffer tank. This enables the cooler process fluid in the buffer tank to be used in lowering the temperature of the coolant fluid. In some applications, the coolant fluid may be used to elevate the temperature of the process fluid or portions of the process fluid to create beneficial effects.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology which facilitate the removal of heat from various heat sources in process applications. For example, the system and methodology are useful in well applications, such as fracturing applications, in which a cooler process fluid is passed through a buffer tank during an operation involving injecting the process fluid downhole into a wellbore. The cooler process fluid is used to remove heat from a coolant fluid, e.g. coolant liquid, circulated through one or more heat sources. The heat sources may be in the form of electric motors, internal combustion engines, or other heat generating components utilized in pumping or otherwise handling the process fluid. The buffer tank may be in the form of a header tank and serves as a heat exchanger. The process fluid freely flows through the buffer tank without causing fouling, thus eliminating or reducing the use of additional heat exchangers which tend to take substantial space in a space limited environment.

According to an embodiment, the present technique combines the buffer tank with a heat exchange system and the heat exchange system includes a conduit carrying a coolant fluid. The coolant fluid is flowed along the conduit which is routed through or past the heat source to remove excess heat from the heat source. Additionally, the conduit is routed to the buffer tank so that the cooler process fluid moving through the buffer tank is able to remove heat from the coolant fluid before it is routed back to the heat source for continued heat removal. In some applications, the coolant fluid may be used to elevate the temperature of the process fluid or portions of the process fluid to create beneficial effects.

In some well applications, the process fluid may comprise a fracturing fluid, e.g. a fracturing fluid gel and/or water, flowed through a header tank located on a transport vehicle, such as an over-the-road truck. However, the transport vehicle may be in other forms, including skids used in offshore applications. By way of example, the heat source may be in the form of an electric motor or internal combustion engine used to operate mixers and pumps for delivering the process fluid both through the header tank and downhole into a wellbore. A heat exchanger is combined with the header tank and comprises at least a portion of the conduit which carries the coolant fluid. Thus, heat transferred to the coolant fluid from the heat source is removed by routing the coolant fluid along the conduit and through the buffer tank, e.g. header tank, which contains relatively cooler process fluid, e.g. fracturing fluid. This enables the cooler process fluid in the buffer tank to be used in lowering the temperature of the coolant fluid during the fracturing operation or other operation. Depending on the application, the conduit may be constructed from a variety of materials and in various structural configurations. For example, the conduit may be a single conduit or a plurality of conduits formed of copper tubing, stainless steel tubing, or other suitable tubing materials, positioned within the buffer tank or between walls of the buffer tank. In some applications, the conduit is formed by adjacent walls of a double walled structure. For example, the conduit may be formed and routed between walls of a double walled structure, e.g. a double walled structure used to form the external and/or internal walls of a buffer tank.

Depending on the application, the coolant fluid used to cool the heat source or heat sources may comprise a variety of liquids or other materials. For example, if the heat sources are electric motors, the coolant fluid may comprise water and/or glycol. If, however, the coolant fluid is passed along bearings then the coolant fluid may be in the form of oil directed through appropriate tubing. Other fluids or combinations of fluids also may be used as the coolant fluid depending on the parameters of a given application and the characteristics of the heat sources being cooled. In some applications, an auxiliary heat exchanger may be used in combination with the buffer tank and corresponding conduit routed along or through the buffer tank.

Figure 1:
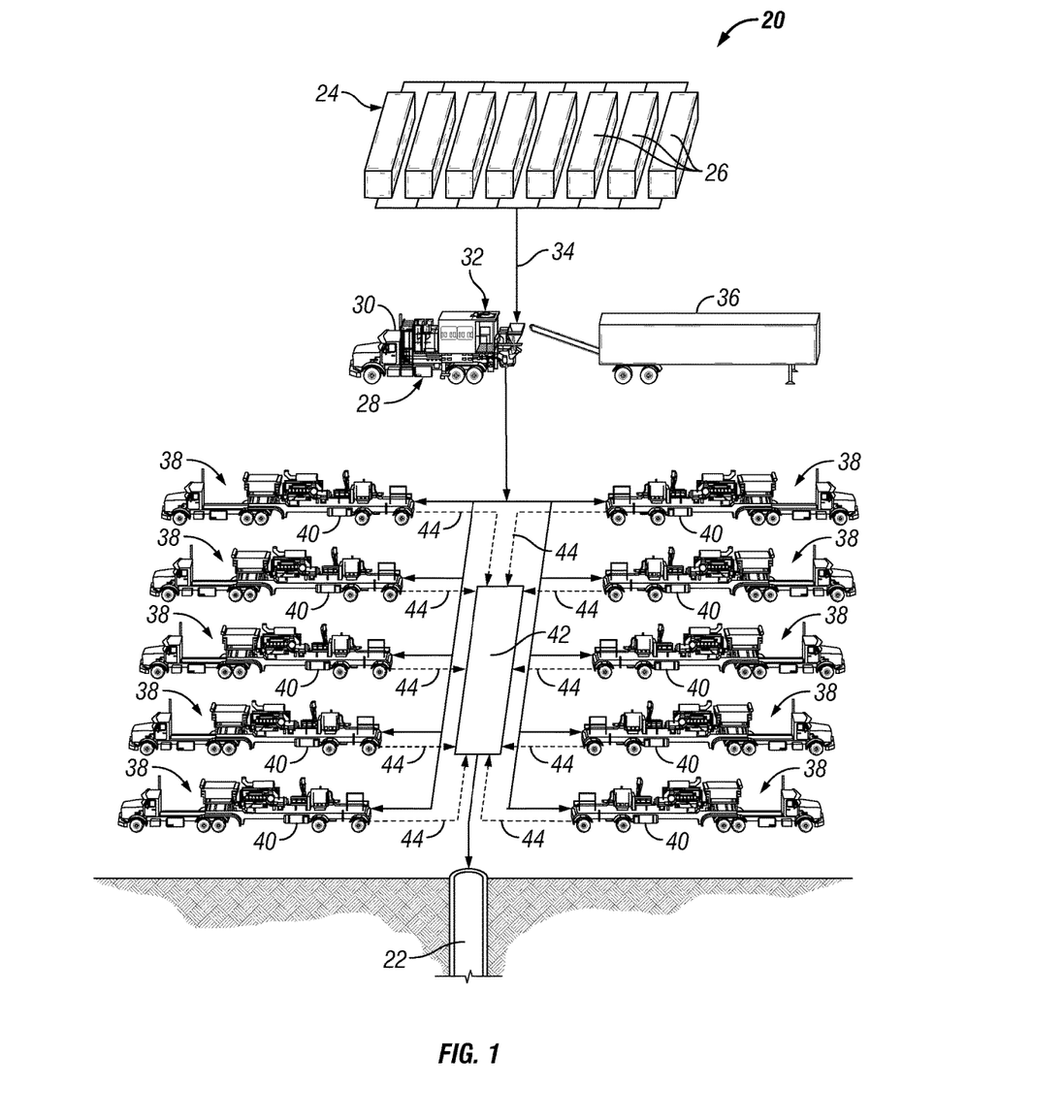
FIG. 1 is a schematic illustration of an example of a system for preparing and delivering a process fluid into a wellbore, according to an embodiment of the disclosure.

Referring generally to FIG. 1, an embodiment of a well system 20 for preparing and delivering fluids into a wellbore 22 is illustrated. In this example, the well system 20 may be constructed for performing a hydraulic fracturing operation in wellbore 22, however the well system 20 may be constructed and used in a variety of other applications. The well system 20 may be located at a well site, or portions may be located at the well site while other portions are located remotely relative to the well site. In the example illustrated, well system 20 further comprises a fluid source 24 including, for example, one or more tanks 26 containing fracturing fluid, e.g. water and/or gel, or other suitable fluid referred to as "process fluid". The process fluid also may be combined with other materials to create a desired viscosity, pH, composition, or other specific characteristic in the process fluid. The process fluid is then delivered into the wellbore 22 during performance of an offshore wellbore operation or onshore wellbore operation, such as hydraulic fracturing.

The well system 20 also may comprise a fluid preparation assembly 28. In some applications, the fluid preparation assembly 28 is in the form of a vehicle 30, such as an over-the-road truck or a ship in an offshore application. In the present example, the vehicle 30 comprises a blender truck having a buffer tank 32 through which process fluid flows before being delivered downhole into wellbore 22. For example, the fluid preparation assembly 28 may receive the process fluid from fluid source 24 via an inlet line 34 and then combine the process fluid with one or more additives, such as gelling agents, so as to form a gelled process fluid. In some applications, the fluid preparation assembly 28 also may receive additives from a proppant feeder 36, and the additives may be blended with the gelled process fluid to provide a process fluid in the form of a fracturing fluid. The fluid preparation assembly 28 also may comprise blenders, mixers, pumps, electric motors, internal combustion engines, or other components which tend to produce heat. As described in greater detail below, heat is removed to avoid excessive temperatures by utilizing the cooler process fluids in the buffer tank 32.

In the example illustrated, well system 20 further comprises one or more high-pressure pumping assemblies 38 which also may be in the form of over-the-road trucks 40. The high-pressure pumping assemblies 38 have heat sources, e.g. electric motors or internal combustion engines for driving pumps. In some applications, the high-pressure pumping assemblies 38 also comprise buffer tanks 32 for cooling the heat sources via process fluid flowed through the buffer tanks. Depending on the operation, auxiliary heat exchangers may be used on the high-pressure pumping assemblies 38 and/or fluid preparation assembly 28 to assist in removing heat generated by the heat sources.

The high-pressure pumping assemblies 38 may be fluidly coupled together via one or more common manifolds 42. Initially, process fluid may be pumped at a relatively low pressure to the pumping assemblies 38, and then the pumping assemblies 38 pump the process fluid at higher pressure into the manifold or manifolds 42 via high-pressure lines 44. The level of high pressure may be determined according to the application but in some applications the high pressure ranges from about 5000 psi (41.4 MPa) to about 15,000 psi (124.2 MPa) at flowrates of, for example, between about 10 barrels per minute and about 100 barrels per minute although other pressures and flowrates may be used. Other numbers of pumping assemblies 38 also may be employed to achieve desired pressures and flowrates. The pressurized process fluid then flows from the manifold or manifolds 42 to wellbore 22 so that it may be delivered downhole under high pressure for performance of a fracturing operation or other desired operation.

Figure 2:
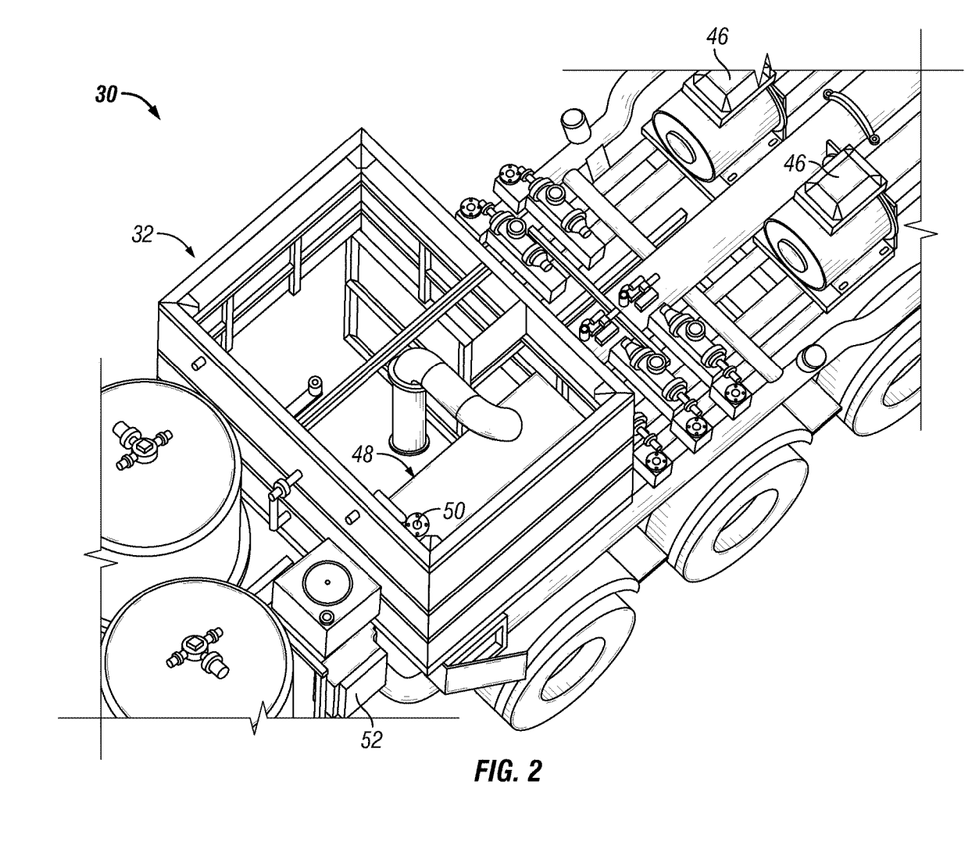
FIG. 2 is an illustration of an example of a transport vehicle having a process fluid buffer tank, heat source, and heat exchange system associated with the process fluid buffer tank, according to an embodiment of the disclosure.

Referring generally to FIG. 2, an example of vehicle 30 is illustrated. In this example, the vehicle 30 comprises an over-the-road mixer truck, but the vehicle 30 may comprise other types of transport vehicles, e.g. pumping trucks 40 or mobile seaborne vehicles. Generally, the vehicle 30 is mobile in the sense that it may be readily moved and may comprise a truck, trailer, float, skid, ship, or other transport vehicle. As illustrated, the vehicle 30 comprises buffer tank 32 and a plurality of heat sources 46. The buffer tank 32 may comprise a header tank or another type of tank through which process fluid is flowed at volumes adequate for providing the desired cooling. A heat exchanger 48 is incorporated with the buffer tank 32 and has a coolant flow conduit 50 exposed to the process fluid when the process fluid is in the interior of the buffer tank 32. The coolant flow conduit 50 may comprise an individual conduit or a plurality of conduits arranged in various patterns to cool an internally flowing coolant fluid. For example, the coolant flow conduit 50 may be formed between plates of the heat exchanger 48 and/or it may be formed from coiled or serpentine tubes. In some applications, the process fluid is sprayed on the coolant flow conduit or conduits 50 before flowing out of the other side of the heat exchanger 48 and then out of the buffer tank 32.

The coolant flow conduit 50 is routed from the buffer tank 32 and along the heat sources 46 such that the internally flowing coolant fluid, e.g. coolant liquid, is able to remove heat generated by the heat sources 46. The coolant fluid is then flowed along the flow conduit 50 to buffer tank 32 so as to allow the substantially larger volumes of process fluid moving through the buffer tank 32 to remove heat, thus cooling the coolant fluid. A suitable pump or pumps may be positioned along the coolant flow conduit 50 so as to continuously circulate the coolant fluid between the heat sources 46 and the buffer tank 32. In some applications, an auxiliary heat exchanger 52 may be coupled to the coolant flow conduit 50 to provide additional cooling, e.g. to provide cooling in situations when process fluid is not flowing through buffer tank 32.

Figure 3:
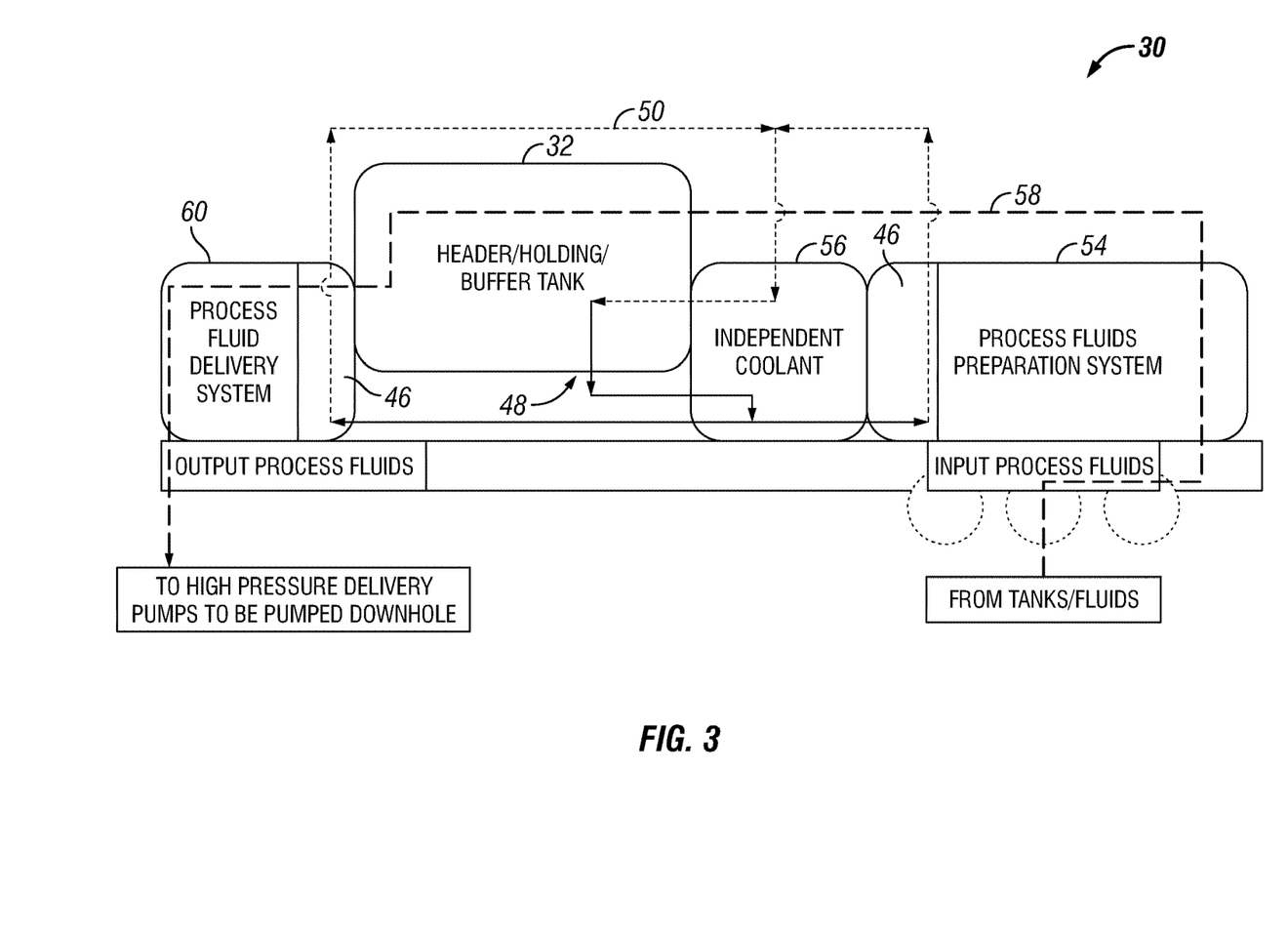
FIG. 3 is a schematic illustration of an example of a transport vehicle having a process fluid system and an independent coolant fluid system, according to an embodiment of the disclosure.

Referring generally to FIG. 3, a schematic illustration is provided showing an example of component placement and possible flow routes of both process fluid and coolant fluid. In this example, the vehicle 30 comprises a process fluids preparation system 54 which includes heat sources 46, such as electric motors, internal combustion engines, pumping components, bearings, and/or other heat generating components. Additionally, the vehicle 30 comprises buffer tank 32, e.g. a header tank, and an independent coolant system 56 comprising heat exchanger 48 and coolant conduit 50. In this example, the process fluid is represented by arrow 58 which flows from fluid source 24 and into preparation system 54.

During an operation, e.g. a fracturing operation, the process fluid 58 is prepared at preparation system 54 and then pumped or otherwise delivered to buffer tank 32. The process fluid 58 flows through buffer tank 32 and is discharged into a process fluid delivery system 60 which routes the process fluid to wellbore 22. While the process fluid flows through buffer tank 32, the independent coolant system 56 operates to route coolant fluid past one or more of the heat sources 46 so as to remove excess heat from the heat sources. The heated coolant fluid is then routed via coolant conduit 50 to buffer tank 32 where heat exchange occurs with the processing fluid 58 moving through the buffer tank 32. It should be noted that heat sources 46 may be at a variety of locations and part of a variety of systems independent of the buffer tank 32. In the illustrated embodiment, for example, heat sources 46 may be part of preparation system 54 and/or process fluid delivery system 60.

The coolant conduit 50 may be arranged in a variety of patterns and/or constructions to form heat exchanger 48 and to effect the desired heat exchange and cooling of the coolant fluid. In many applications, the flow of cooler process fluid 58 in buffer tank 32 is substantially greater than the flow of coolant fluid through conduit 50 such that substantial cooling of the coolant fluid occurs before it is routed back to the heat source or sources 46. The independent coolant system 56 may be operated to circulate the coolant fluid continuously so that it continues to move past the heat sources 46 and through the buffer tank 32. In some applications, the independent coolant system 56 is started at suitable times, e.g. upon initiation of flow of process fluid 58, rather than being operated continuously.

Figure 4:
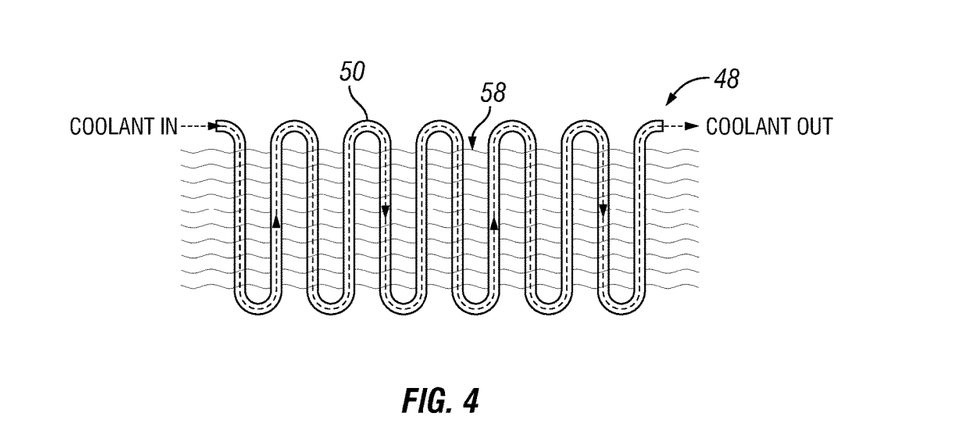
FIG. 4 is a schematic illustration of an example of a conduit that may be used for heat exchange in cooperation with a buffer tank, according to an embodiment of the disclosure.

Referring generally to FIG. 4, an example of heat exchanger 48 is illustrated in which the coolant conduit 50 is arranged in a serpentine or coiled configuration. In this example, the illustrated section of coolant conduit 50 is positioned in the interior of buffer tank 32 such that the process fluid 58 flows past the serpentine section of coolant conduit 50 as the process fluid 58 moves through buffer tank 32. Simultaneously, the coolant fluid is flowed along the interior of coolant conduit 50 so as to achieve the desired heat exchange from the hotter coolant fluid to the cooler process fluid. In this example, at least a portion of the coolant conduit 50 is disposed within buffer tank 32, and the conduit 50 may comprise tubing formed from a conductive material, such as copper or stainless steel, to facilitate heat transfer.

Figure 5:
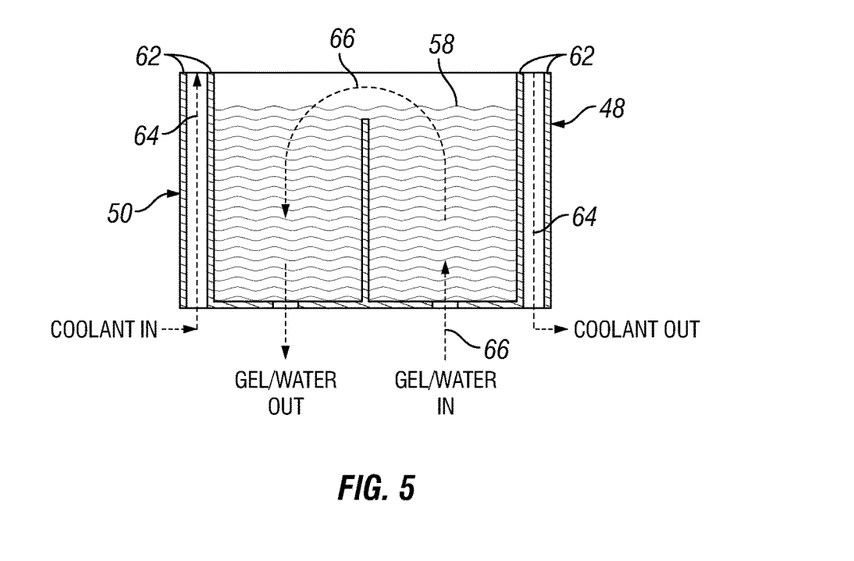
FIG. 5 is a schematic illustration of another example of a conduit that may be used for heat exchange in cooperation with a buffer tank, according to an embodiment of the disclosure.

In another embodiment, the conduit 50 is formed by a double wall configuration in which adjacent walls 62 are spaced to enable flow of the coolant fluid between the walls as illustrated by arrows 64. The adjacent walls 62 may be arranged to form heat exchanger 48 in a configuration which allows the heat exchanger 48 to be positioned within the interior of buffer tank 32. As the process fluid 58 flows through buffer tank 32 along a route indicated by arrows 66, the coolant fluid is flowed along conduit 50 formed between adjacent walls 62. In this example, the adjacent walls 62 are formed of a suitably conductive material, e.g. copper or stainless steel, which allows heat to be transferred from the hotter coolant fluid to the cooler process fluid. In some embodiments, the adjacent walls 62 may be used to form the actual exterior walls of the buffer tank 32.

Figure 6:
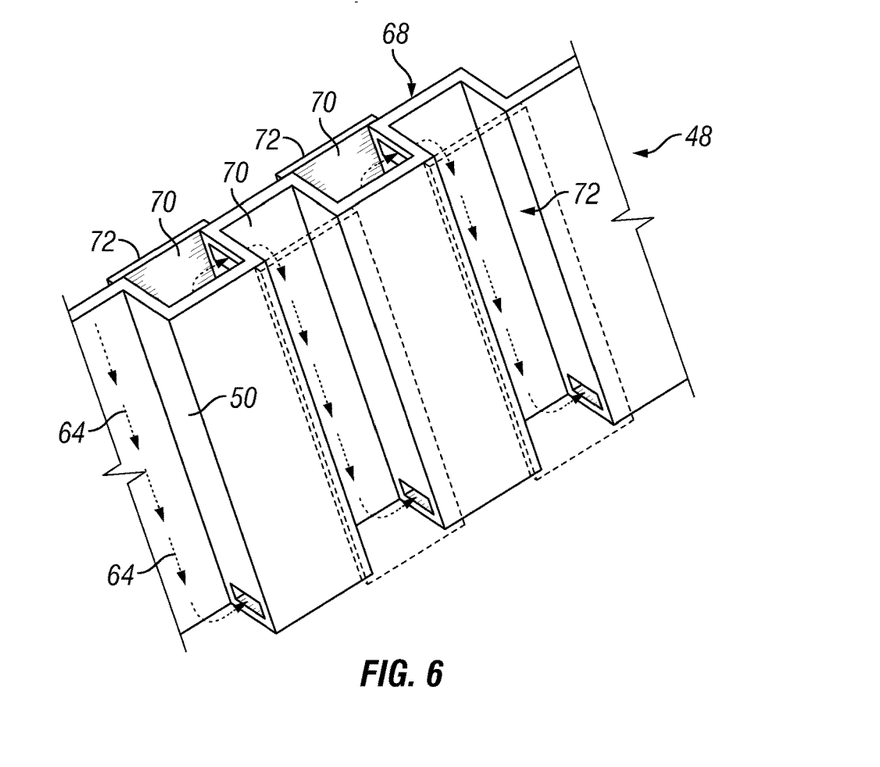
FIG. 6 is a schematic illustration of another example of a conduit that may be used for heat exchange in cooperation with a buffer tank, according to an embodiment of the disclosure.

In another embodiment, the heat exchanger 48 is formed with a corrugated panel or panels 68, as illustrated in FIG. 6. By way of example, selected channels 70 of the corrugated panel 68 may be enclosed by supplemental panels 72 which are welded or otherwise secured to the corrugated panel 68 to form conduit 50 along which the coolant fluid flows, as indicated by arrows 64. The corrugated panel or panels 68 may be positioned within buffer tank 32 and/or used to form the exterior walls of buffer tank 32. Similar to other embodiments described herein, the corrugated panel(s) may be formed of a suitably conductive material, e.g. copper or stainless steel, which allows heat to be transferred from the hotter coolant fluid to the cooler process fluid as the hotter coolant fluid flows along the channels 70 and as the cooler process fluid flows along the corrugated panel(s) 68 during movement of the process fluid through buffer tank 32.

In some applications, the wall surface of the corrugated panels 68 (or the wall surface of tubing, dual walls, or other structures forming conduit 50) may be roughened or otherwise treated to create turbulent flow so as to improve heat transfer. In these and other embodiments described herein, the conduit 50 may be formed of corrosion resistant materials or treated to provide corrosion resistance during exposure to the process fluid 58.

Figure 7:
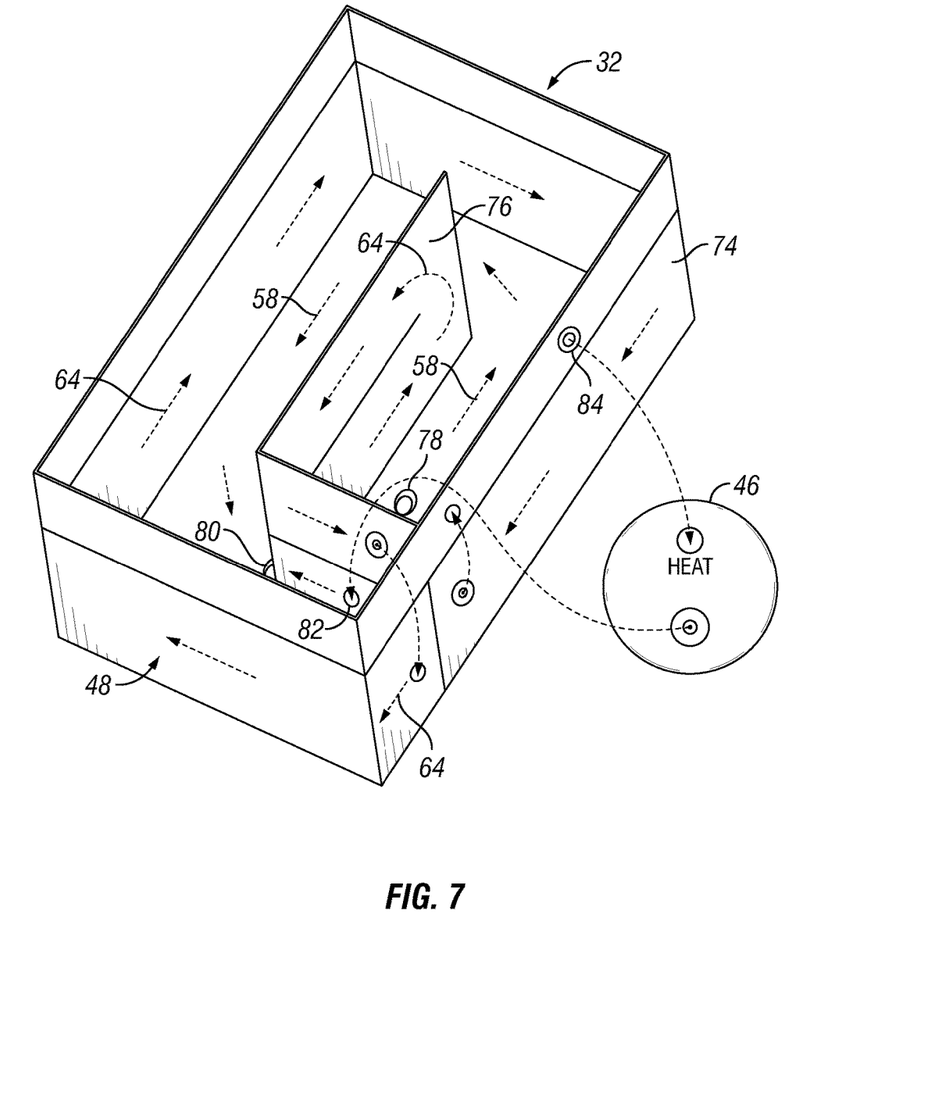
FIG. 7 is a schematic illustration of another example of a conduit that may be used for heat exchange in cooperation with a buffer tank, according to an embodiment of the disclosure.
Figure 8:
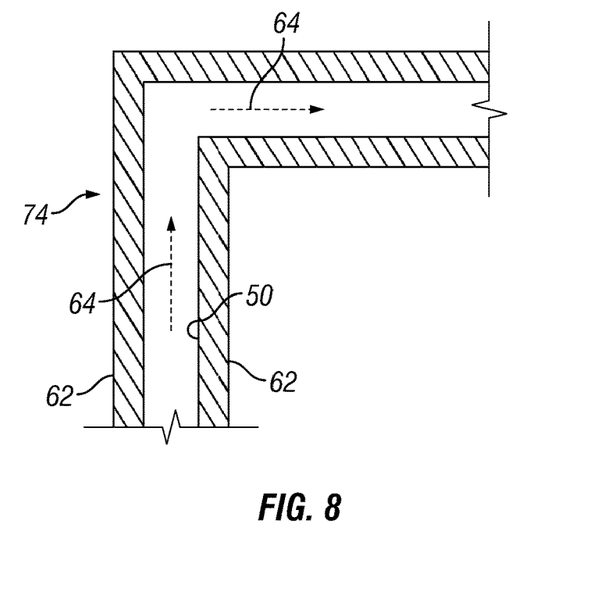
FIG. 8 is a schematic illustration of an example of a portion of a buffer tank wall forming a section of the conduit, according to an embodiment of the disclosure.

Referring generally to FIGS. 7 and 8, an embodiment of buffer tank 32 is illustrated in which the conduit 50 is formed in exterior structural walls 74 which define the exterior of the buffer tank 32, see FIG. 8. In some applications, however, the conduit 50 also may be routed along the interior of internal walls 76 to promote enhanced heat exchange between the process fluid and the coolant fluid. By way of example, the conduit 50 may be formed with a dual wall structure similar to the embodiment described above with reference to FIG. 5. As illustrated in FIG. 8, the structural walls 74 and/or internal walls 76 may be formed with this dual wall structure having adjacent walls 62 disposed with an appropriate separation to form conduit 50. The coolant fluid flows between adjacent walls 62 as represented by arrows 64. In some applications, a variety of dividers or other obstructions may be used between the adjacent walls 62 to conduct the flow of coolant fluid 64 along a desired flow path within the walls 74/76.

Referring again to FIG. 7, process fluid 58 is directed into an interior of buffer tank 32 through an appropriate inlet port 78. The process fluid 58 flows through buffer tank 32 along structural walls 74 and internal walls 76 before exiting the buffer tank through an appropriate outlet port 80. Simultaneously, coolant fluid (which has been heated by one or more heat sources 46) flows along conduit 50 formed within the walls 74, 76 of buffer tank 32. By way of example, the coolant fluid may be introduced into heat exchanger 48, and thus into the portion of conduit 50 associated with buffer tank 32, via a coolant fluid inlet port 82.

As represented by arrows 64, the coolant fluid flows through conduit 50 along a desired path within the walls 74, 76 of buffer tank 32 before exiting via a coolant fluid outlet port 84. After exiting outlet port 84, the coolant fluid is circulated back past the heat source or sources 46 before once again being returned to heat exchanger 48 of buffer tank 32.

The walls 74, 76 may be formed of a suitably conductive material, e.g. stainless steel. The conductive material allows heat to be transferred from the hotter coolant fluid to the cooler process fluid as the hotter coolant fluid flows along the interior of walls 74, 76 and as the cooler process fluid flows through the interior of buffer tank 32. The process fluid 58 then exits buffer tank 32 via outlet port 80 and is directed to wellbore 22 for an appropriate well operation, e.g. fracturing operation.

The heat exchange technique may have a variety of configurations for use in numerous types of well applications and non-well applications. Depending on the application, the process fluid preparation and delivery system 54 may comprise a variety of components, such as pumps, blending/mixing devices, prime movers (e.g. electric motors, internal combustion engines, hydraulics), and piping systems. Similarly, the independent coolant system 56 may comprise a variety of components, such as coolant pumps, independently cooled prime movers for driving the coolant pumps, filters, and various conduit systems and structures. Additionally, the buffer tank 32 may have a variety of configurations selected to buffer flow of process fluid while facilitating exchange of heat from the coolant fluid to the process fluid. The coolant fluid also may comprise various fluid formulations having, for example, anti-freeze components, corrosion inhibitors, and/or other additives.

In some applications, the overall system may further comprise the auxiliary heat exchanger 52 which can be used to enable operation of the preparation system 54 and delivery system 60 at lower capacities and without the aid of process fluids passing through the buffer tank 32. For example, lower duty applications may include function tests during manufacturing when some of the pumps are simply operated to recirculate water while bypassing the buffer tank 32.

In a variety of applications, the heat sources 46 are not operating and thus not generating heat when no process fluid is being mixed or delivered. In this situation, the process fluid in the buffer tank 32 is stagnant. During such periods, the independent coolant system 56 and the flow of coolant along conduit 50 can be stopped. Or, the flow in conduit 50 may be allowed to continuously run depending on the parameters of a given application. In some applications, the heat obtained from the coolant fluid also may be used for enhancing certain aspects of the operation, such as heating at least portions of the process fluid 58 to enhance chemical reactions.

Well system 20 may be adapted to accommodate many types of parameters related to specific applications. In some applications, for example, mixers or agitators may be placed in the buffer tank 32 to facilitate heat exchange by moving the process fluid 58 along the heat exchanger 48. In some embodiments, the buffer tank 32 may be open to the atmosphere, and the process fluid may be agitated to reject heat into the atmosphere. Additionally, the conduit 50 may be routed close to the outlet port of the buffer tank 32 where there may be more turbulent flow and thus greater heat exchange. The heat exchanger 48, e.g. conduit 50 associated with buffer tank 32, also may be placed along the bottom of the buffer tank 32 and/or at other suitable locations which maximize heat exchange and cooling of the coolant fluid.

Additionally, embodiments in which the conduit 50 is routed within the walls 74, 76 of the buffer tank 32, the walls 74, 76 may be separated into different sections, e.g. lower and upper sections. The different sections may be used to create a coolant reservoir for the coolant fluid system 56. In some applications, heat exchange fins may be attached to surfaces of coolant conduit 50 and/or buffer tank 32 to increase a heat exchange contact area with the process fluid and/or ambient environment.

Various internal features, e.g. internal wall 76, may be added to the buffer tank 32 to create a desired flow path for the process fluid within the buffer tank 32 so as to increase the area available for heat exchange. The internal features may be arranged to create a desired forced path for the process fluid and may be used to establish a first-in-first-out flow path. When the conduit 50 is formed between adjacent exterior walls 62 of the buffer tank 32, the construction establishes both a liquid-liquid heat exchanger as well as a liquid-air heat exchanger when air is the ambient medium adjacent the exterior walls 62/74 of the buffer tank 32. Accordingly, numerous arrangements of components and configurations of process fluid flow paths and coolant fluid flow paths may be constructed to facilitate heat exchange in a space efficient manner.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for removing heat, comprising:
a well system to deliver a process fluid downhole into a wellbore;
a transport vehicle having a buffer tank through which the process fluid is continuously flowed;
a heat exchanger disposed in the buffer tank and having a coolant flow conduit exposed to the process fluid when the process fluid is flowing through the buffer tank; and
a heat source cooled by a coolant which is flowed through the heat exchanger and the coolant flow conduit.

2. The system as recited in claim 1, wherein the transport vehicle comprises an over-the-road truck.

3. The system as recited in claim 1, wherein the well system comprises a well formation fracturing system and the process fluid comprises fracturing fluid.

4. The system as recited in claim 1, wherein the coolant flow conduit comprises a tubing positioned within the buffer tank.

5. The system as recited in claim 1, wherein the coolant flow conduit comprises a serpentine tubing positioned within the buffer tank.

6. The system as recited in claim 1, wherein the coolant flow conduit comprises a conduit formed in a wall of the buffer tank.

7. The system as recited in claim 1, wherein the coolant flow conduit comprises channels of a corrugated panel.

8. The system as recited in claim 1, wherein the buffer tank comprises a header tank.

9. The system as recited in claim 1, wherein the heat source comprises at least one electric motor.

10. The system as recited in claim 1, wherein the heat source comprises at least one internal combustion engine.

11. The system as recited in claim 1, further comprising an auxiliary heat exchanger coupled to the coolant flow conduit.

12. A method for removing heat, comprising:
continuously pumping a process fluid through a buffer tank;
cooling a heat source with a coolant fluid;
pumping the cooling fluid through the buffer tank;
while pumping the process fluid and the cooling fluid through the buffer tank, using the process fluid flowing in the buffer tank to cool the coolant fluid; and
pumping the process fluid directly from the buffer tank to a process fluid delivery system.

13. The method as recited in claim 12, further comprising locating the buffer tank on a transport vehicle.

14. The method as recited in claim 13, wherein pumping further comprises pumping the process fluid from the process fluid delivery system downhole into a wellbore.

15. The method as recited in claim 14, further comprising fracturing a formation with the process fluid.

16. The method as recited in claim 13, wherein using the process fluid comprises routing the coolant fluid through a tube located within the buffer tank.

17. The method as recited in claim 13, wherein using the process fluid comprises routing the coolant fluid through a conduit formed in a wall of the buffer tank.

18. The method as recited in claim 13, wherein locating the buffer tank on the transport vehicle comprises locating the buffer tank on a ship.

19. A system, comprising:
a transport vehicle having a buffer tank through which a process fluid continuously flows, a plurality of heat sources cooled by at least one coolant fluid, and a heat exchange system having a conduit exposed to the process fluid in a heat exchanger within the buffer tank, the conduit circulating the at least one coolant fluid between the heat source and the heat exchanger within the buffer tank while the process fluid flows through the buffer tank.

20. The system as recited in claim 19, wherein a portion of the conduit is located within a structural wall of the buffer tank to establish a liquid-liquid heat exchanger as well as a liquid-air heat exchanger.

* * * * *